United States Patent
Igarashi et al.

[11] Patent Number: 5,429,169
[45] Date of Patent: Jul. 4, 1995

[54] RADIAL TIRE FOR MOTORCYCLE WITH TWO PART BEAD APEX

[75] Inventors: Yasuo Igarashi, Kawanishi; Toru Fukumoto, Akashi; Kazuhiro Hirose, Kobe; Ryozo Okada, Takarazuka, all of Japan

[73] Assignee: Sumitomo Rubber Industries, Ltd., Hyogo, Japan

[21] Appl. No.: 219,267

[22] Filed: Mar. 29, 1994

[30] Foreign Application Priority Data

Apr. 16, 1993 [JP] Japan .................. 5-113696

[51] Int. Cl.⁶ .............. B60C 3/04; B60C 9/22; B60C 15/06
[52] U.S. Cl. .................. 152/454; 152/526; 152/527; 152/530; 152/531; 152/533; 152/541; 152/546; 152/547; 152/554; 152/555
[58] Field of Search .......... 152/541, 546–547, 152/539, 533, 531, 527, 454, 554, 526, 530, 555

[56] References Cited

U.S. PATENT DOCUMENTS

| | | | |
|---|---|---|---|
| 4,120,338 | 10/1978 | Mirtain | 152/541 |
| 4,962,803 | 10/1990 | Welter | 152/541 |
| 5,198,051 | 3/1993 | Suzuki et al. | 152/533 X |
| 5,234,043 | 8/1993 | Suzuki et al. | 152/533 X |

FOREIGN PATENT DOCUMENTS

| | | |
|---|---|---|
| 0124617 | 11/1984 | European Pat. Off. |
| 0456438 | 11/1991 | European Pat. Off. |
| 3-8961 | 2/1991 | Japan |
| 3248903 | 11/1991 | Japan .................. 152/546 |

OTHER PUBLICATIONS

Patent Abstracts of Japan, vol. 16, No. 44 (M-1207) 4 Feb. 1992 & JP-A-03 248 903.

*Primary Examiner*—Adrienne Johnstone
*Attorney, Agent, or Firm*—Birch, Stewart, Kolasch & Birch

[57] ABSTRACT

A radial tire for motorcycle has a belt layer of cords with modulus of elasticity of 600 kg/mm² or more wound spirally on a carcass nearly parallel to the tire equator, and a bead apex rubber disposed on a bead core between a carcass main portion extending from a tread to a bead core and a carcass turned up portion. The bead apex rubber consists of a soft apex part SA with JISA hardness of 50 to 60 degrees extending radially outward from the bead core, and a hard apex part HA with JISA hardness of 70 to 95 degrees extending radially outward from the soft apex part SA. A height h1 of the soft apex part SA from a bead base is 0.20 to 0.40 times a height h0 of the tread end, and a height h2 of the hard apex part HA is 0.50 to 1.25 times the height h0 of the tread end.

4 Claims, 5 Drawing Sheets

RADIAL TIRE FOR MOTORCYCLE WITH TWO PART BEAD APEX

BACKGROUND OF THE INVENTION

The present invention relates to a radial tire for motorcycle capable of maintaining the comfort of riding while heightening the steering stability and durability in high speed traveling.

FIELD OF THE INVENTION

In the recent years, accompanying the development of the highway networks and high speed vehicles, radial tires have been introduced to the motorcycle.

Such a radial tire for motorcycle comprises a carcass with a radial structure and a belt layer. Then, in order to improve the comfort of riding, Japanese Patent Publication Hei. 3-8961 proposes to use a belt layer of belt cords arranged parallel to the tire equator instead of the conventional cross belt ply in which the cords are cross to each other.

This parallel belt ply is, as compared with the cross belt ply, small in rigidity of the ground contact surface, and is expected to improve the comfort of riding by lowering the bending rigidity in the radial direction of the tread ground contact surface and improving the ground contact performance.

Use of the parallel belt ply is, however, accompanied by a decrease of lateral rigidity of the tread. Further, since the radial tire has a radial arrangement of carcass cords, it is inferior in the lateral rigidity of the entire tire, causing a "flabby" phenomenon when turning, in particular, and hence the steering stability tends to be sacrificed.

Therefore, in order to enhance the rigidity of tire side walls, Japanese Patent Publication Hei. 3-8961, also, proposes to heighten a turned up portion of the carcass, employ a hard rubber with hardness of 60 degrees or more as a bead apex rubber, and heighten the bead apex rubber. Further, it has been proposed to employ a cord reinforcing layer covering the turned up portion in the tire side wall.

However, if JISA hardness of the bead apex rubber is set at 60 degrees or more and the height of the bead apex rubber is heightened in order to improve the rigidity of the side wall itself to a level preferable for steering stability, since the bead apex rubber extends from the bead core in one united body, the longitudinal rigidity of tire becomes so high that the comfort of riding is lowered. Still more, heat generation of the bead increases, and durability tends to decline.

Incidentally, since the carcass cords are arranged radially, the lateral rigidity is not enhanced so much as expected by heightening the turned up part of the carcass, or using the cord reinforcing layer.

As mentioned above, the steering stability, comfort of riding and durability are generally conflicting goals, and are not solved sufficiently.

After intensive studies by the inventors into the relation with the bead apex rubber, its volume, steering stability, vibration, comfort of riding and durability of bead, It is found that, by dividing the bead apex rubber into a soft rubber part adjacent to the bead core and a hard rubber part extending from the soft rubber part, the camber thrust can be kept high, the vertical spring constant can be lowered so as to maintain the comfort of riding, and the heat generation in the bead can be suppressed.

SUMMARY OF THE INVENTION

It is hence a primary object of the invention to present a tire for motorcycle capable of enhancing the steering stability without sacrificing the performances such as comfort of riding and durability.

According to one aspect of the present invention, a radial tire for motorcycle comprises
- a carcass having a main portion extending from a tread through side walls to a bead core in each of two beads and a pair of turned up portions turned up around the respective bead core, and composed of at least one carcass ply of cords laid at an angle of 70 to 90 degrees to the tire equator,
- a belt layer disposed radially outside the carcass and in the tread, and composed of at least one belt ply of cords with modulus of elasticity of 600 kg/mm$^2$ or more wound spirally nearly parallel to the tire equator, and
- a bead apex rubber with nearly triangular cross section disposed on the respective bead core between the main part and respective turned up part of the carcass,
- said tread having a tread straight width between tread ends in the tire's axial direction which is larger than a maximum width of the tire in the tire's axial direction at side walls and having a surface being an approximately arc shape in the tire meridian section, wherein
- the bead apex rubber consists of
  - a soft apex part SA composed of a soft rubber composition with JISA hardness of 50 to 60 degrees extending outwardly in the tire's radial direction from a bottom surface adjacent to the respective bead core and
  - a hard apex part HA composed of a hard rubber composition with JISA hardness of 70 to 95 degrees extending outwardly in the tire's radial direction from the respective soft apex part SA,
  - a height h1 of the radially upper end P1 of the soft apex part SA from a respective bead base is 0.20 to 0.40 times a height h0 of the respective tread end from the respective bead base, and
  - a height h2 of the radially upper end P2 of the hard apex part HA from the respective bead base is 0.50 to 1.25 times the height h0 of the respective tread end.

Since the hard apex part HA divided from the bead apex rubber is disposed from a bead to the high position of the side wall, the lateral rigidity is improved so as to obtain a sufficient camber thrust in turning at any camber angle, and the turning performance is enhanced. Further, a response to handling becomes quick, and dizziness of the vehicle is effectively suppressed to significantly improve the steering stability. As for lowering of riding comfort due to the hard apex, the soft apex part SA lowered In hardness by 10 degrees or more (preferably 20 degrees or more) than the hard apex part HA is disposed. Since the soft apex part SA is provided on the bead core in a range of 0.20 to 0.40 times the tread end height, the longitudinal spring constant is lowered so as to improve the riding comfort while maintaining the moderate lateral rigidity. The complex modulus of the soft apex part may be lowered, or rubber with small loss tan δ may be used for the soft apex order to lower heat generation.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

Figure 1:
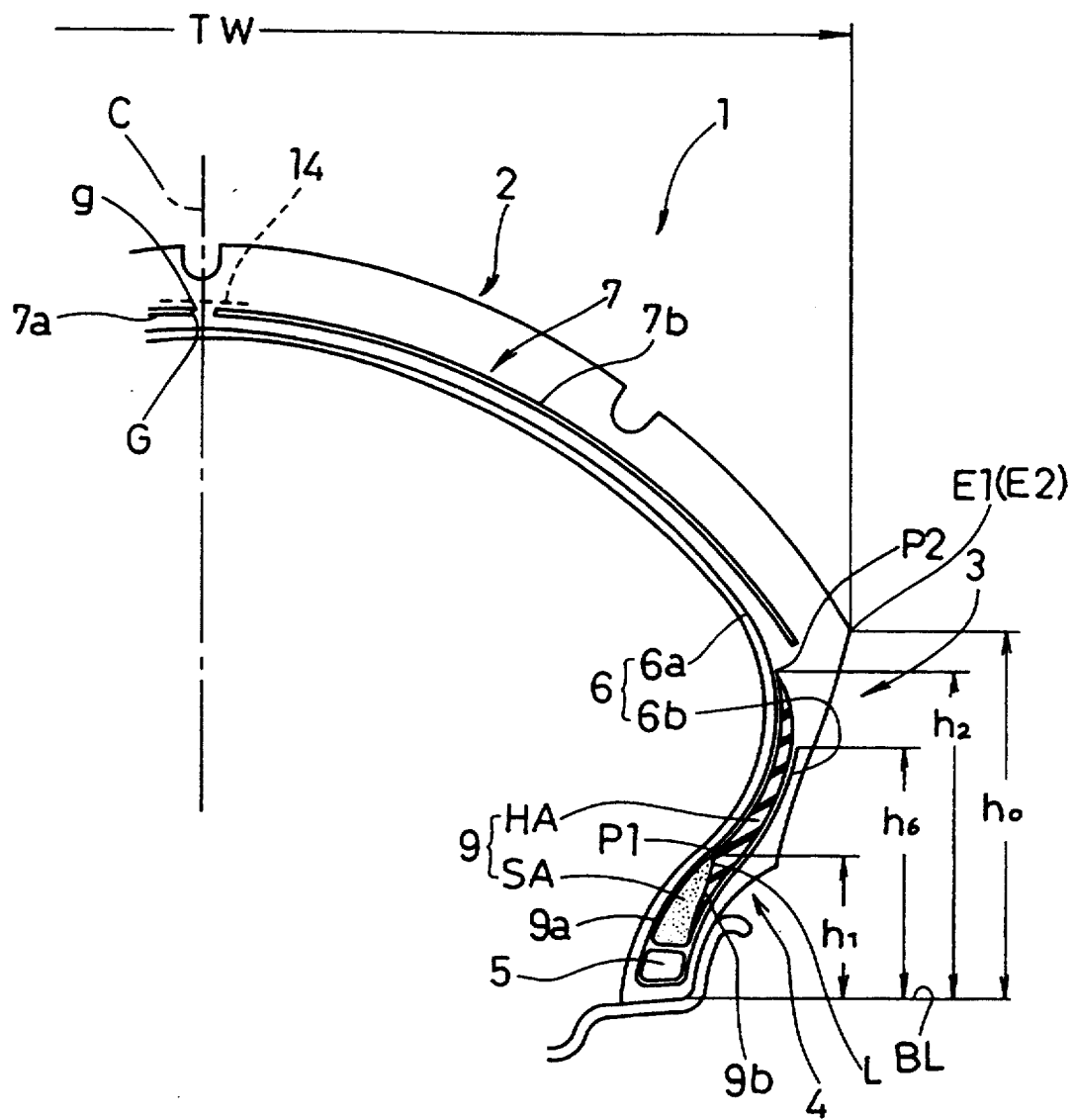
FIG. 1 is a sectional view of an embodiment of the invention.
Figure 2:
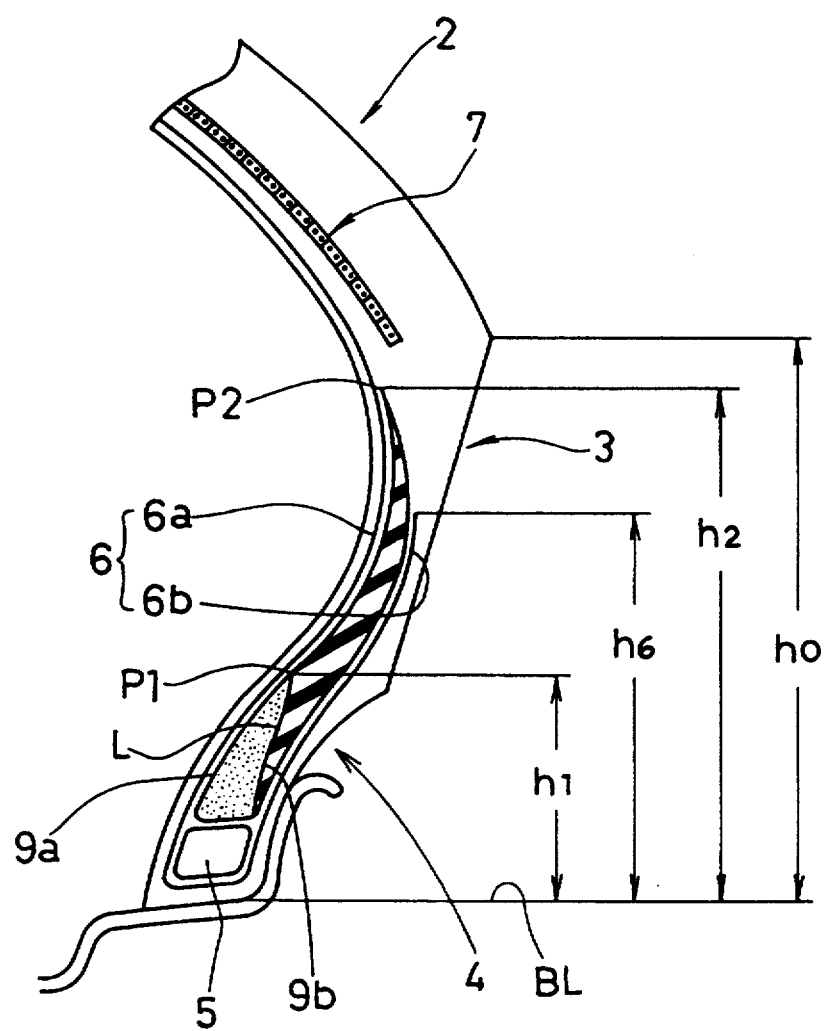
FIG. 2 is a sectional view showing a magnified view of a bead.

A pneumatic tire 1 for motorcycle comprises a tread 2, two side walls 3 each extending inwardly in the tire's radial direction from both ends of the tread 2 and two beads 4, one located at the inward end of each sidewall 3 and reinforced by a bead core 5. A tread surface in the tire meridian section extends along an approximate arc between tread ends E1, E2, and a tread straight width TW between the tread ends in the tire's axial direction is larger than a maximum width of the tire in the tire's axial direction at side walls.

The pneumatic tire 1, also, comprises a carcass 6 extending between the bead cores 5, a belt layer 7 disposed radially outside the carcass 6 and in the tread 2, and a bead apex rubber 9 with a triangular sectional shape extending outwardly in the tire's radial direction from the bead core 5.

The carcass 6 has a main portion 6a extending from the tread 2 through the sidewalls 3 to the bead core 5 and a pair of turned up portions 6b each turned up around the bead core 5 from inside to outside in the tire's axial direction. The carcass 6 comprises at least one, one in this embodiment, carcass ply of cords inclined at an angle of 70 to 90 degrees. The carcass cords are made of nylon, rayon, polyester, aromatic polyamide, or other organic fiber cords.

The turned up portion 6b extends radially outwardly, and a height h6 of radially upper end thereof from a bead base BL is set in a range of 0.5 to 1.25 times a height h0 of tread ends E1 from the bead base BL.

The belt layer 7 comprises at least one, one in this embodiment, belt ply formed by spirally winding the belt cords 11 in parallel to the tire equator C. The belt cords 11 are made of aromatic polyamide, polyester, other organic fiber cords or inorganic fiber cords of a high modulus of elasticity of 600 kg/mm² or more.

As mentioned above, since the carcass has a radial structure, and belt cords 11 are spirally wound nearly parallel to the tire equator, the bending rigidity of tread in the tire's radial direction is low and the ground contact performance is improved. Further, the lifting of the tread in high speed traveling is suppressed by the band effect by the belt layer of the belt cord 11 with the modulus of elasticity of 600 kg/mm², so that high speed durability is enhanced. If the modulus of elasticity is less than 600 kg/mm², the rigidity of the tread is insufficient, and the high speed durability is lowered together with the high speed straight traveling turning. The aromatic polyamide fiber has a high tensile force equivalent to that of steel, and is excellent in flexibility, and is hence used favorably. Since the belt cords 11 are arranged nearly parallel to the tire equator, the traveling stability is excellent. Moreover, since the bending rigidity of the ground contact surface is low, the ground contact area of the tire in all running conditions is sufficiently wide. As a result, the grip force increases notably, while it is possible to cope easily with undulations of the road surface, so that a stable grip feeling may be always obtained to maintain stable traveling.

The belt ply is preferably formed by spirally winding a long and narrow band-shaped ply strip 10 having belt cords 11, thereby reducing seams and a step difference of the belt ply, and enhancing the durability, uniformity and steering stability.

Figure 4:
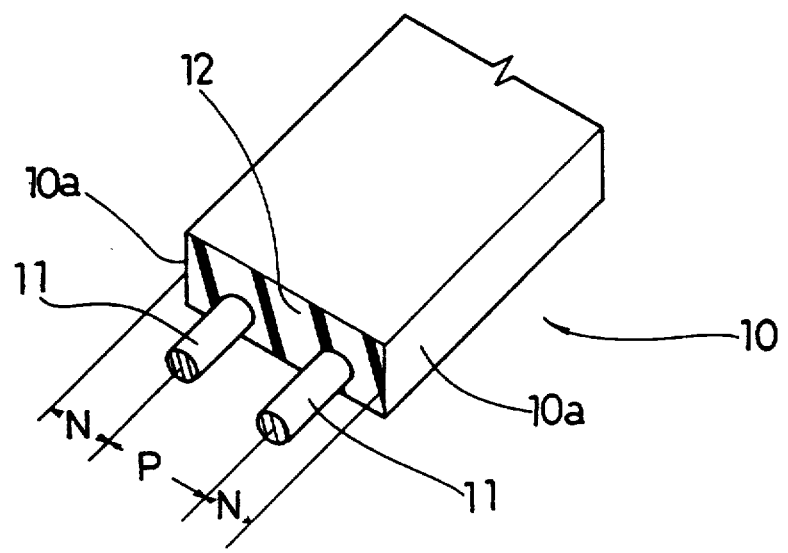
FIG. 4 is a perspective view showing an example of a belt ply strip.
Figure 5:
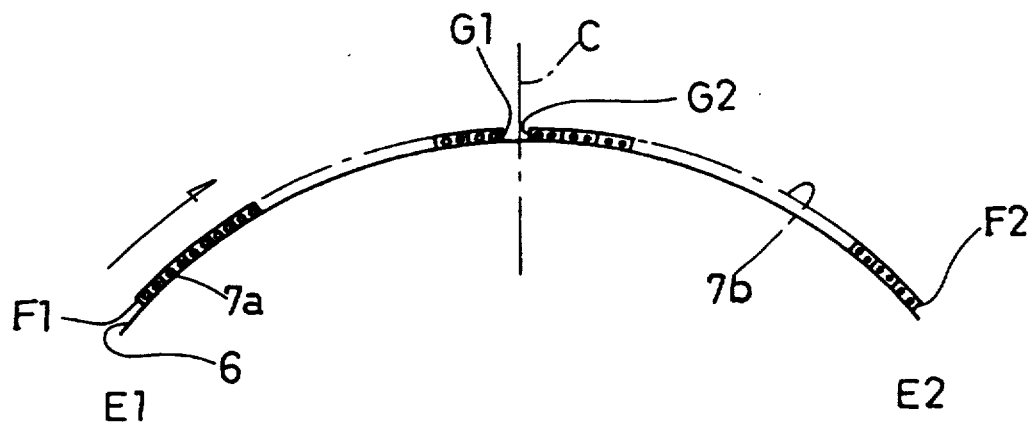
FIG. 5 is a sectional view showing winding of the belt ply strip.

The ply strip 10 has one or plural, two in the embodiment, belt cords 11 in parallel alignment embedded in a topping rubber 12, as shown in FIG. 4.

In the embodiment, the ply strip 10 has a flat rectangular shape, and the distance N from the side edge 10a to the center of the belt cord at the outermost position from the side edge 10a is set at ½ or less of the pitch P of the belt cords 11.

The belt ply may be made of one ply strip 10 continuously wound on the outer circumference of the carcass 6 from one belt end F1 beyond the tire equator C to the other belt end F2. Or the belt ply may consist of left and right ply pieces 7a, 7b each made of one ply strip 10 wound between one belt end F1, F2 and a point G1, G2 near the tire equator C.

Figure 6:
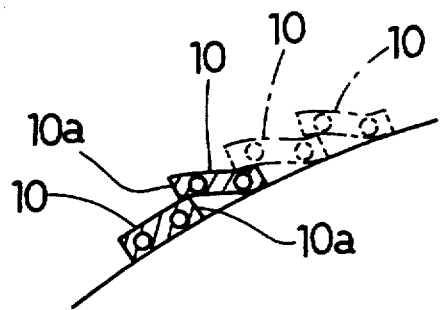
FIG. 6 is a partial magnified view of the wound belt ply strip.

Furthermore, as shown in FIG. 6, the ply strip 10 may be wound in such a manner that one side edge 10a overlaps near the opposite side end 10a when wound, thereby preventing the ply strip 10 from loosening and peeling at the belt ends F1, F2 where a large force acts upon traveling.

Figure 7:
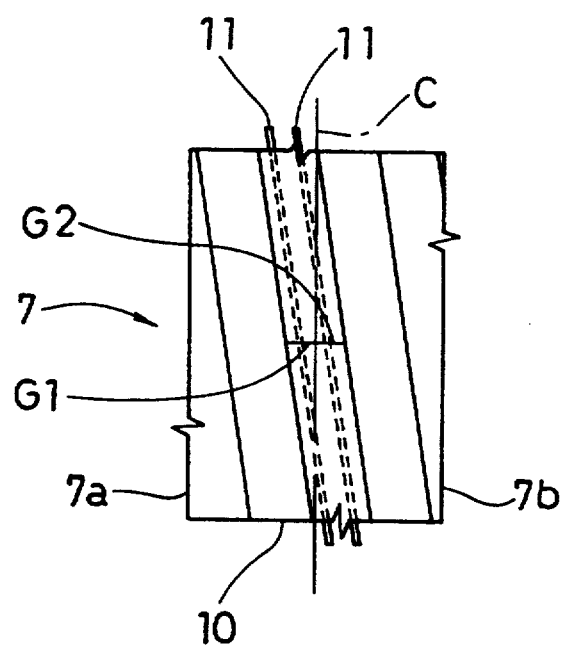
FIG. 7 is a plan view showing an example of a terminal end of the belt ply strip.

On the other hand, a small gap of less than the pitch P of the belt cords 11 may be presented between the belt pieces 7a, 7b. But as shown in FIG. 7, it is also possible to set the belt plies 10, 10 without a small gap, and bond the edges of the belt pieces 7a, 7b to each other with an adhesive.

As indicated by dotted line in FIG. 1, on the other hand, by covering the Junction of the belt pieces 7a, 7b with a narrow reinforcing piece 14, the small gap g between the belt pieces 7a, 7b is reinforced, thereby preventing formation of a rigidity fault in the belt layer 7.

The bead apex rubber 9 is disposed on the bead core 5 between the main portion 6a and the turned up portion 6b of the carcass 6, and divided into a soft apex part SA composed of soft rubber composition with JISA hardness of 50 to 60 degrees, preferably 50 to 55 degrees, and a hard apex part HA composed of hard rubber composition with JISA hardness of 70 to 95 degrees, preferably 75 to 90 degrees.

The soft apex part SA is in an approximately triangular sectional shape composed of the bottom surface adjacent to the bead core 5, an inner oblique side surface 9a along the main portion 6a of the carcass 6 and an outer oblique side surface 9b. The outer oblique side surface 9b extends approximately in the tire's radial direction. A height h1 of the radially upper end P1 of the soft apex part SA from the bead base BL is 0.20 to 0.40 times a height h0 of the tread end E1, E2 from the bead base BL.

The hard apex part HA extends outwardly in the tire's radial direction from the outer oblique side surface $9b$, and contacts with the outer oblique side surface $9b$ so as to form the contacting surface L. The hard apex part HA is an approximately triangular sectional shape having contacting surface as a bottom, and a height $h2$ of the radially upper end P2 of the hard apex part HA from the bead base BL is 0.50 to 1.25 times, preferably 0.8 to 1.25 times the height $h0$ of the tread end.

Figure 3:
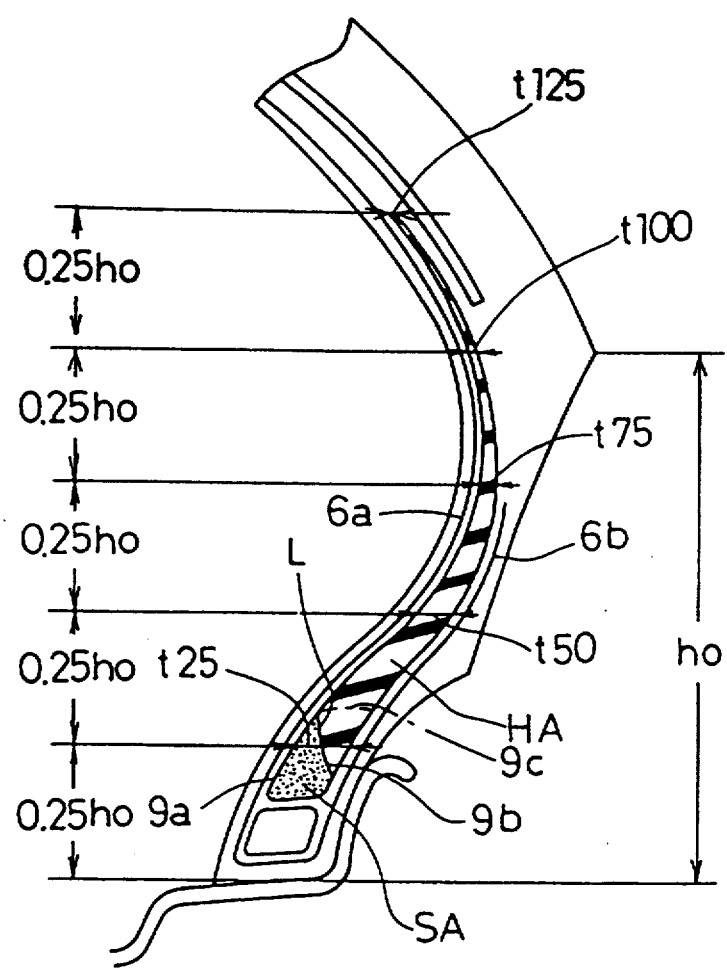
FIG. 3 is a sectional view showing another embodiment.

In the soft apex part SA, as shown in FIG. 3, tile outer oblique side surface $9b$ may be inclined inward in the tire's axial direction to the radial outward direction, or the outer oblique side surface $9b$ may be apart from the bottom surface so as to detach the hard apex part HA from the bead core 5. Furthermore, as indicated by single dot chain line in FIG. 3, the soft apex part SA may be formed to a tetragonal shape having the upper surface $9c$ approximately in parallel to the tire axis.

The soft apex part SA has a complex modulus of elasticity SE* of 30 to 100 kg/cm$^2$, preferably 40 to 60 kg/cm$^2$, and the hard apex part HA has a complex modulus of elasticity HE* of 150 to 700 kg/cm$^2$, preferably 200 to 550 kg/cm$^2$. And the difference (HE*−SE*) of the complex modulus of elasticity HE* and the complex modulus of elasticity SE* is 150 kg/cm$^2$ or more.

JISA hardness of the hard apex part HA is larger than JISA hardness of the soft apex part SA by 10 degrees or preferably 20 degrees or more.

If the difference (HE*−SE*) becomes less than 150 kg/cm2, rubber properties of both are close to each other, and desired effects are not expected in the performance such as riding comfort and steering stability. In the same way, when the hardness difference is 10 degrees or more, or preferably 20 degrees or more, the riding comfort and the steering stability can be improved.

In such constitution of the hard apex part HA, the lateral rigidity of the side wall 3 may be enhanced, and "flabby" feeling when turning and "dizziness" of vehicle when running straight can be eliminated, and the steering stability is improved.

Furthermore, in the side wall 3, in order to absorb vibrations and suppress lowering of riding comfort, a loss tan δ of the hard apex part HA is preferably set in a range of 0.20 to 0.25, as a result, the vibration force acting on the side wall 3 is attenuated, and noise is lowered.

On the other hand, the longitudinal rigidity is improved by the soft apex part SA in the above composition, thereby maintaining the riding comfort without sacrificing the performances such as the steering stability.

Accordingly, in the soft apex part SA, as compared with the hard apex part HA, the JISA hardness and complex modulus of elasticity SE* are set lower, thereby adjusting the lateral rigidity and riding comfort as mentioned above. At the same time, by setting the heights $h1$, $h2$ of the upper ends P1, P2 of the soft apex part SA and hard apex part HA within the specified range, the lateral rigidity is effectively heightened without sacrificing the riding comfort, and the camber thrust when turning is enhanced in particular, thereby improving the turning performance.

As for the soft apex part SA, moreover, by setting the loss angle tanδ at 0.08 to 0.15, preferably 0.08 to 0.12, being smaller than in the hard apex part HA, heat generation by deformation due to rolling of tire may be suppressed.

The loss angle tan δ and the complex modulus of elasticity E* are the values measured by a viscoelasticity spectrometer manufactured by Iwamoto Seisakusho in the condition of temperature of 70 degrees C., frequency of 10 Hz and dynamic strain of 2(±1) %.

Incidentally, in the tire of 2.75 to 4.50 size specified as high speed type (H type) in JIS D 4203, the bead apex rubber 9 is preferably defined as follows;

the height $h1$ and the height $h2$ are preferably 0.4 and 1.25 times the height $h0$, respectively; then, the sectional thickness $t50$ (shown in FIG. 3) in the tire's axial direction at the height of 50% of the tread end height $h0$ from the bead base BL is preferably set to be 0 mm/(4 to 6) mm, when expressed as soft apex part SA thickness/hard apex part HA thickness, the thickness $t25$ at a height of 25% be (5 to 7)mm/(0 to 2)mm, the thickness $t75$ at a height of 75% be 0 mm/(2 to 5)mm, the thickness $t100$ at a height of 100% be 0/(1 to 3)mm, and the thickness $t125$ at a height of 125% be 0/(0 to 2) mm, approximately.

EXAMPLES

Tires in tire size 190/50R17 were fabricated in the composition conforming to FIGS. 1, 2, 4 and 5, and in the specification as defined in Table 3 (embodiments, comparisons), and were tested. A conventional tire 1 composed only of hard rubber apex was also tested. The rubber compositions are shown in Tables 1, 2.

The test conditions were as follows:

1) Steering stability, flabbiness, riding comfort

Test tires were mounted on the rear wheel of a motor cycle, while the front wheel was loaded with a standard 130/70R16 tire. The vehicle was tested on a test road at a speed of 260 km/hr on a straight lane, and at 220 km/hr on a curved road at a radius of curvature of 400 m. The performance was evaluated by the feeling of the test rider. The test results are shown by index in Table 3. The greater figure means the better performance.

2) High speed durability test

The test tires at tire internal pressure of 3.0 kgf/cm$^2$ and load of 355 kg were set in a drum testing machine of 60 inches in diameter. The test was started at initial speed of 250 km/hr and accelerated at a rate of 10 km/hr in every 10 minutes in the speed-up system, and the high speed durability test was judged by the running distance until a crack was formed in the tread. In Table 3, the practical example is indicated by the index 100, and the greater figure means the better performance.

As a result of the test, the embodiments 1 to 7 were judged to be excellent in all test items as compared with the conventional tire and comparisons 1 to 7.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| | Rubber blends other than invention | | | |
|---|---|---|---|---|
| | TT Tread rubber, | SW Sidewall rubber, | CC topping rubber, (carcass) | BL topping rubber (belt layer) |
| NR-rubber | — | 40.0 | 58.0 | 70.0 |
| BR-rubber | — | 60.0 | — | — |
| SBR-rubber (1712) | 100 | — | 42.0 | — |
| SBR-rubber (1500) | — | — | — | 30.0 |
| Carbon black | | | | |
| ISAF | 65 | — | — | — |
| FEF | — | 50.0 | — | — |
| GPF (N660) | — | — | 26.3 | — |
| HAF (N330) | — | — | 31.5 | 45.0 |
| Thermoset resin | — | — | 3.0 | — |
| Aromatic oil | 12.8 | 6.0 | — | 7.0 |
| Resin | — | 3.0 | 3.0 | 3.0 |
| Wax | 2.75 | 1.2 | — | — |
| Anti-agent | 1.79 | 3.0 | — | 1.0 |
| Stearic acid | 2.0 | 2.5 | 1.7 | 2.0 |
| Zinc white, | 2.5 | 2.5 | 3.0 | 5.0 |
| Sulfur | 1.5 | 1.5 | 3.0 | 3.0 |
| Promoter | 1.5 | 0.68 | 1.08 | 2.5 |
| Retarder | — | 0.15 | — | — |

TABLE 2

| | Rubber blends | | | | | | | |
|---|---|---|---|---|---|---|---|---|
| | HA1 | HA2 | HA3 | HA4 | HA5 | SA1 | SA2 | SA3 |
| NR-rubber | 70 | 100 | 70 | 100 | 70 | 75 | 100 | 70 |
| SBR-rubber | 30 | — | 30 | — | 30 | 25 | — | 30 |
| Reclaim (R500) | — | — | — | — | — | — | — | — |
| Oil | 4.0 | 3.0 | 4.0 | 4.0 | 9.0 | 8.4 | 6.0 | 5.0 |
| Stearic acid | 2.5 | 2.0 | 2.5 | 2.3 | 2.5 | 2.0 | 2.0 | 1.5 |
| Zinc white, | 4.0 | 5.0 | 4.0 | 5.0 | 5.0 | 3.7 | 8.0 | 3.0 |
| Sulfur | 2.5 | 1.5 | 2.5 | 2.5 | 2.5 | 1.5 | 2.5 | 2.0 |
| Promoter | 2.5 | 2.0 | 3.5 | 2.5 | 2.5 | 1.1 | 1.0 | 1.0 |
| Resin | 15.0 | 20.0 | 8.0 | 15.0 | 8.0 | 2.0 | 3.0 | 1.0 |
| Carbon black | | | | | | | | |
| HAF | 65 | 50 | 70 | 70 | 60 | — | — | — |
| GPF | — | — | — | — | — | — | — | 45 |
| ISAF | — | 20 | — | — | — | 50 | 45 | — |
| Hard clay | — | — | — | — | — | — | — | 10 |
| JISA hardness | 86 | 95 | 88 | 90 | 72 | 57 | 59 | 50 |
| Loss tan δ (degrees) | 0.21 | 0.28 | 0.22 | 0.20 | 0.23 | 0.23 | 0.08 | 0.12 |
| complex modulus E* (kg/cm²) | 310 | 550 | 202 | 303 | 209 | 60 | 54 | 40 |

TABLE 3

| | Embodiments | | | | | | | Conventinal | Comparisons | | | | | | |
|---|---|---|---|---|---|---|---|---|---|---|---|---|---|---|---|
| Test tire (190/50R17) | 1 | 2 | 3 | 4 | 5 | 6 | 7 | 1 | 1 | 2 | 3 | 4 | 5 | 6 | 7 |
| Carcass | | | | | | | | | | | | | | | |
| Cord material | nylon (2/1260d) | | | | | | | nylon (2/1260d) | nylon (2/1260d) | | | | | | |
| Cord angle | 90 degrees | | | | | | | 90 degrees | 90 degrees | | | | | | |
| ply number | 2 | | | | | | | 2 | 2 | | | | | | |
| ratio h6/h0 | 0.8 | | | | | | | 0.55 | 0.7 | | | | | | |
| topping rubber | CC | | | | | | | CC | CC | | | | | | |
| Belt layer | | | | | | | | | | | | | | | |
| Cord material | | | | | | | | aromatic polyamide (3/1500d) | | | | | | | |
| Cord angle | | | | | | | | about 0 degrees | | | | | | | |
| ply number | | | | | | | | 1 | | | | | | | |
| topping rubber | | | | | | | | BL | | | | | | | |
| belt type | | | | | | | | spiral | | | | | | | |
| Tread rubber | | | | | | | | TT | | | | | | | |
| Sidewall rubber | | | | | | | | SW | | | | | | | |
| Soft apex part SA | | | | | | | | | | | | | | | |
| Rubber blend | SA1 | SA1 | SA3 | SA3 | SA2 | SA1 | SA1 | HA3 | SA1 | HA3 | SA1 | HA3 | HA3 | SA1 | SA1 |
| Ratio h1/h0 | 0.20 | 0.4 | 0.3 | 0.4 | 0.4 | 0.4 | 0.4 | 0.5 | 0.5 | 1.0 | 1.25 | 1.0 | 1.0 | 0.5 | 0.4 |
| Thickness of SA/HA: t25 | 0/6 | 6/1 | 2/4 | 6/1 | 6/1 | 6/1 | 6/1 | 4 | 4 | 7 | 7 | 4 | 8 | 6/1 | 6/1 |
| JISA hardness | 57 | 57 | 50 | 50 | 59 | 57 | 57 | 88 | 57 | 88 | 57 | 88 | 88 | 57 | 57 |
| Loss tan δ | 0.23 | 0.23 | 0.12 | 0.12 | 0.08 | 0.23 | 0.23 | 0.22 | 0.23 | 0.22 | 0.23 | 0.22 | 0.22 | 0.23 | 0.23 |
| SE* | 60 | 60 | 40 | 40 | 54 | 60 | 60 | — | 60 | — | 60 | — | — | 60 | 60 |
| Hard apex part HA | | | | | | | | | | | | | | | |
| Rubber blend | HA1 | HA1 | HA3 | HA5 | HA1 | HA4 | HA2 | — | — | — | — | — | — | HA3 | HA3 |
| JISA hardness | 86 | 86 | 88 | 72 | 86 | 90 | 95 | — | — | — | — | — | — | 88 | 88 |
| Loss tan δ | 0.21 | 0.21 | 0.22 | 0.23 | 0.21 | 0.20 | 0.28 | — | — | — | — | — | — | 0.22 | 0.22 |
| HE* | 310 | 310 | 202 | 209 | 310 | 303 | 550 | 202 | — | 202 | — | 202 | 202 | 202 | 202 |
| Ratio h2/h0 | 0.5 | 1.25 | 0.5 | 1.00 | 1.00 | 1.00 | 1.00 | — | — | — | — | — | — | 1.0 | 1.30 |
| Thickness of HA: | | | | | | | | | | | | | | | |
| t40 | 5 | 6 | 5 | 5 | 5 | 5 | 5 | — | — | 5 | 6 | 5 | 5 | 5 | 6 |
| t50 | 1 | 5 | 1 | 4 | 4 | 4 | 4 | — | — | 4 | 5 | 4 | 4 | 4 | 5 |
| t75 | — | 4 | — | 3 | 3 | 3 | 3 | — | — | 3 | 4 | 3 | 3 | 3 | 4 |
| t100 | — | 2 | — | 1 | 1 | 1 | 1 | — | — | 1 | 2 | 1 | 1 | 1 | 2 |
| t125 | — | 1 | — | — | — | — | — | — | — | — | 1 | — | — | — | 1 |
| Steering stability | 110 | 115 | 110 | 115 | 110 | 115 | 115 | 100 | 90 | 110 | 95 | 100 | 100 | 105 | 105 |
| Flabbiness | 110 | 115 | 110 | 115 | 110 | 115 | 115 | 100 | 90 | 110 | 95 | 100 | 110 | 108 | 110 |
| Riding comfort | 110 | 110 | 110 | 110 | 110 | 110 | 110 | 100 | 105 | 95 | 110 | 95 | 90 | 110 | 100 |
| Durability | 110 | 110 | 110 | 110 | 110 | 110 | 110 | 100 | 100 | 100 | 100 | 100 | 90 | 110 | 110 |

What is claimed is:

1. A radial tire for motorcycle comprising a carcass having a main portion extending from a tread through side walls to a bead core in each of two beads and a pair of turned up portions turned up around the respective bead core, and composed of at least one carcass ply of cords laid at an angle of 70 to 90 degrees to the tire equator, a belt layer disposed radially outside the carcass and in the tread, and composed of at least one belt ply of cords with modulus of elasticity of 600 kg/mm² or more wound spirally nearly parallel to the tire equator, and a bead apex rubber with nearly triangular cross-section disposed on the respective bead core between the main part and the respective turned up part of the carcass, said tread having a tread straight width between tread ends in the tire's axial direction which is larger than a maximum width of the tire in the tire's axial direction at side walls and having a surface being an approximately arc shape in the tire meridian section, wherein the bead apex rubber consists of
- a soft apex part SA composed of a soft rubber composition with JISA hardness of 50 to 60 degrees extending outwardly in the tire's radial direction from a bottom surface adjacent to the respective bead core and
- a hard apex part HA composed of a hard rubber composition with JISA hardness of 70 to 95 degrees extending outwardly in the tire's radial direction from the respective soft apex part SA, a height h1 of the radially upper end P1 of the soft apex part SA from a respective bead base is 0.20 to 0.40 times a height h0 of the respective tread end from the respective bead base, and a height h2 of the radially upper end P2 of the hard apex part HA from the respective bead base is 0.50 to 1.25 times the height h0 of the respective tread end.

2. The radial tire for motorcycle of claim 1, wherein the soft apex part SA has a complex modulus of elasticity SE* of 40 to 60 kg/cm$^2$, and the hard apex part HA has a complex modulus of elasticity HE* of 200 to 550 kg/cm$^2$.

3. The radial tire for motorcycle of claim 1, wherein the soft apex part SA has a complex modulus of elasticity SE* and the hard apex part HA has a complex modulus of elasticity HE*, the difference between the complex modulus of elasticity HE* of the hard apex part HA and the complex modulus of elasticity SE* of the soft apex part SA being 150 kg/cm$^2$ or more.

4. The radial tire for motorcycle of claim 1, wherein the soft apex part SA is in an approximately triangular sectional shape composed of the bottom surface adjacent to the respective bead core, an inner oblique side surface along the main portion of the carcass and an outer oblique side surface, and the hard apex part HA extends outwardly in the tire's radial direction from the outer oblique side surface of the respective soft apex part SA.

* * * * *